April 27, 1948.  C. H. GEMBERLING  2,440,581
TRACTOR-DRAWN DISC PLOW
Filed April 8, 1944  2 Sheets-Sheet 2
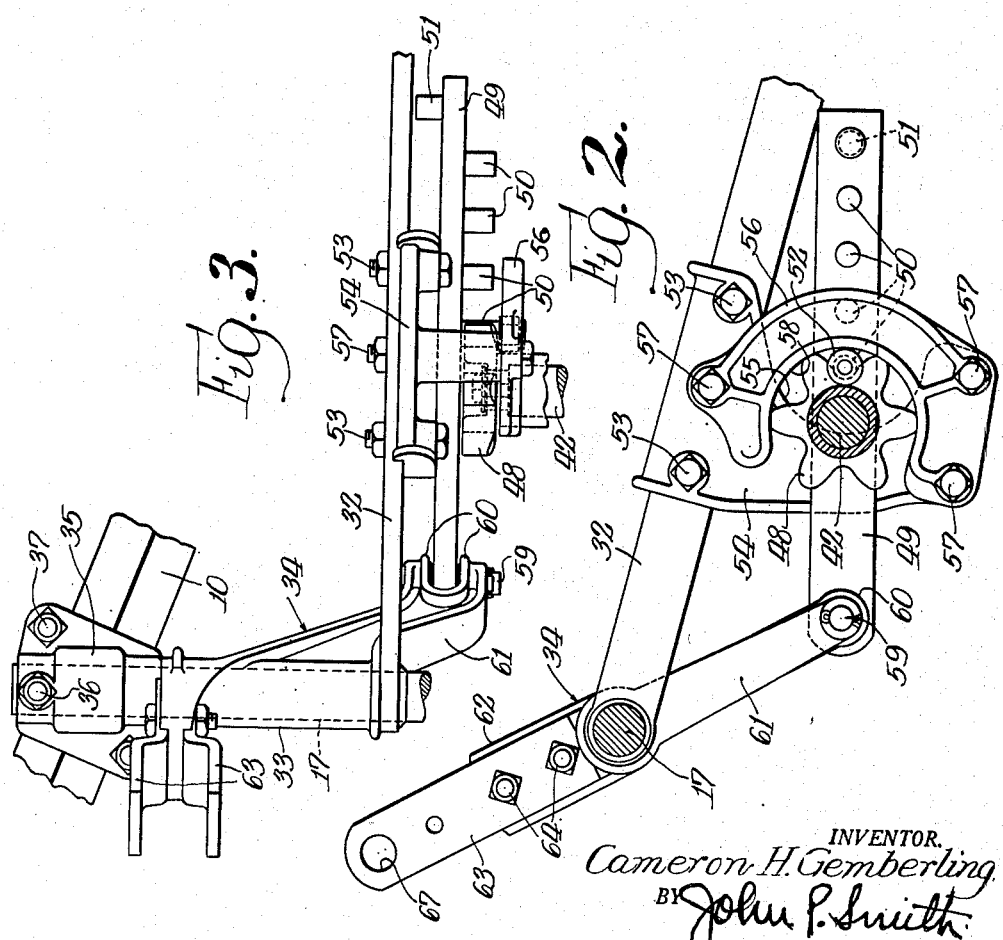
INVENTOR.
Cameron H. Gemberling
BY John P. Smith
Atty.

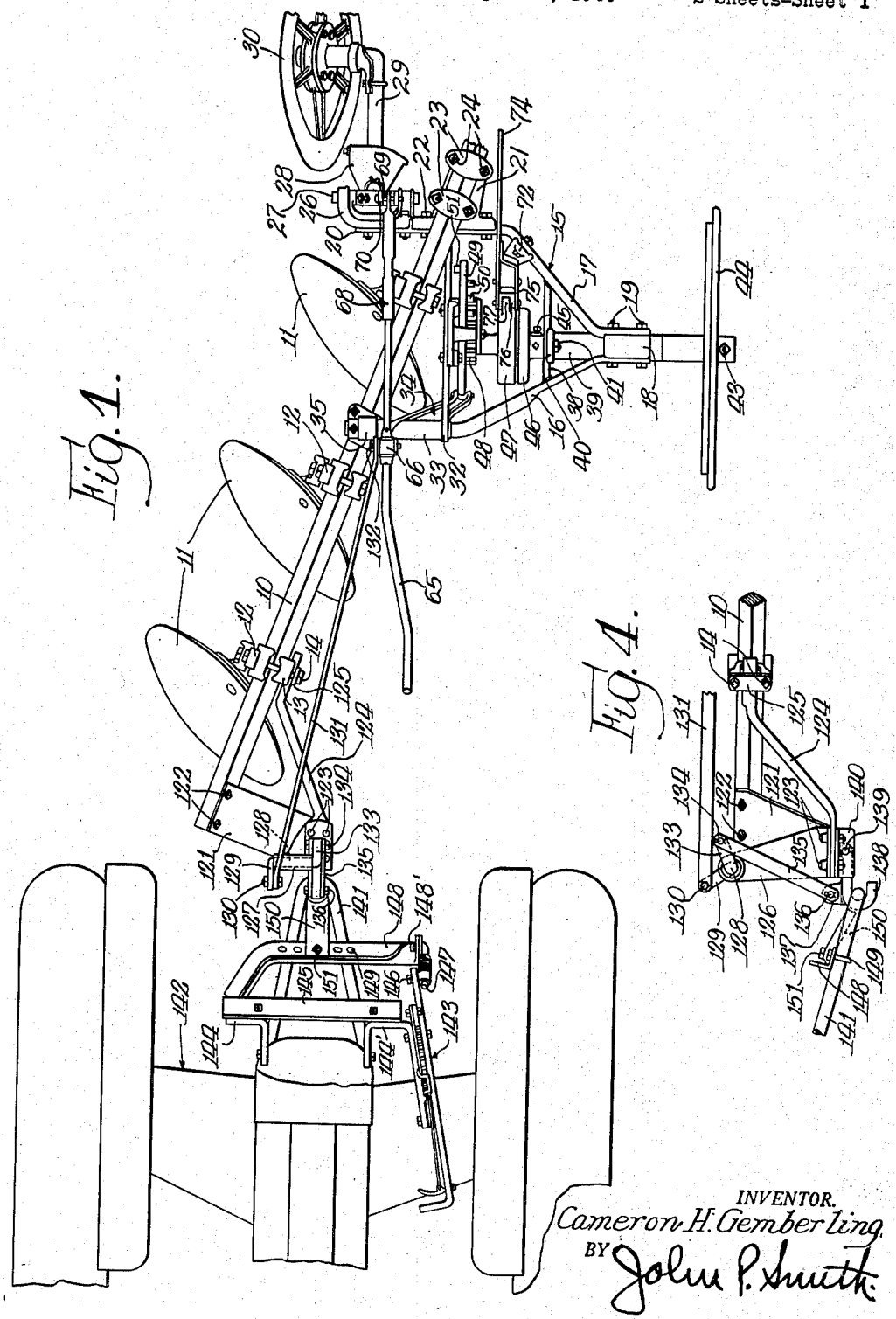

Patented Apr. 27, 1948

2,440,581

UNITED STATES PATENT OFFICE 2,440,581

TRACTOR-DRAWN DISC PLOW

Cameron H. Gemberling, South Bend, Ind., assignor to The Oliver Corporation, a corporation of Delaware Application April 8, 1944, Serial No. 530,191

3 Claims. (Cl. 97—72)

1

The present invention relates generally to plows, but more particularly to a disc plow and a rack and pinion power lift mechanism.

One of the objects of the present invention is to provide a simple, compact and improved overhead beam type of disc plow and a simplified construction of rack and pinion power lift mechanism associated therewith.

A further object of the invention is to provide a novel and improved overhead beam type plow construction in which the land wheel is rigidly attached to the land wheel axle and the clutch power lift mechanism directly connected with said axle at a position spaced inwardly with respect to the land wheel, so as to increase its efficiency and reduce to a minimum the possibility of particles of soil dropping into the clutch mechanism by the rotation of the land wheel.

A still further object of the invention is to provide a novel and improved type of disc plow in which the rear portion of the plow is supported by a rear furrow wheel and a land wheel and the front end of the plow is supported by a tractor in combination with means for raising and lowering the plow by the power lift mechanism of the land wheel.

These and other objects are accomplished by providing a construction and an arrangement of the various parts in the manner hereinafter described and particularly pointed out in the appended claims.

Referring to the drawings:

Fig. 1 is a top plan view of my improved plow construction;

Fig. 2 is an enlarged fragmentary side elevational view of my improved type of rack and pinion power lift mechanism;

Fig. 3 is a top plan view of the mechanism shown in Fig. 2;

Fig. 4 is a detailed side elevational view showing the manner of attachment with the tractor.

In carrying out my invention, I have shown the same as comprising rearwardly and diagonally extending main frame or overhead beam 10 of non-circular cross section and may be of any desired length for adjustably supporting a plurality of discs 11. These discs 11 are suspended from the beam 10 by depending hangers 12 which have their upper ends adjustably secured or clamped to the main beam 10 by clamping caps 13 and bolts 14.

Adjustably secured at a point adjacent the rear end of the main beam 10 to which the rear furrow wheel and land wheel are attached as a unit, is a supplemental frame, generally designated by

2 the reference character 15. This supplemental frame 15 is substantially in the form of a triangle and may be adjusted along the diagonal main frame or beam 10 so that additional discs may be added to those shown in the drawings, or the rearmost disc may be removed from the beam 10 and the supplemental frame moved forwardly so as to reduce the size of the plow. This supplemental frame or unit 15 comprises forwardly and rearwardly diverging frame members 16 and 17 respectively which have their outer ends extending parallel and secured to a land wheel axle bearing bracket 18 by means of bolts 19. The inner portion of the frame member 17 extends at right angles to the line of draft as shown in 20 and is adjustably and slidably secured to the main beam 10 by a bracket 21. The transverse portion 20 of the frame member 17 is secured to the bracket 21 by means of bolts 22. The upper portion of the bracket 21 has a recess therein complementary to the beam for clamping the same thereto by means of clamp caps 23 and bolts 24. Secured to the innermost end of the frame member 17 by means of bolts 25 is a rear furrow wheel axle bracket 26. Pivoted to the rear axle bracket 26 by means of a pin 27 is a rear wheel axle sleeve 28 in which is journaled the upwardly extending shank of the angularly disposed rear furrow wheel axle 29 in the manner well understood in the art. Journaled on the right angularly bent portion of the axle 29 is the usual rear furrow wheel 30. The forward frame member 16 of the supplemental frame 15 is preferably made of round stock and is provided with a shoulder as shown at 31 against which the longitudinal brace member 32 abuts. The rear end of the brace member 32 is secured by being bolted or welded to the transverse portion 20 of the rear frame member 17. The inner portion of the frame member 16 extends through and forms the bearing for a barrel or bearing portion 33 of a lever, generally indicated by the reference character 34, hereinafter more fully described. The inner end of the frame member 16 is secured to a bracket 35 by means of a bolt 36. The bracket 35 is slidably and adjustably secured to the main beam 10 by means of a U-bolt 37. The frame members 16 and 17 of the supplemental adjustable frame 15 is further reinforced by a longitudinal brace member 38 which has its opposite ends bolted or welded to these respective members as clearly shown in Fig. 1 of the drawings. The bearing bracket 18 is provided with a relatively long bearing barrel 39 and is provided at its inner end with an upwardly extending ear 40 which, in turn, is secured to the longitudinal brace 38 by a bolt 41. Journaled in the bearing barrel 39 is a land wheel axle 42. Rigidly secured to the outer end of the land wheel axle 42 by means of a bolt 43 is a land wheel 44. Rigidly secured adjacent the inner end of the land wheel axle 42 by means of set screws 45 is a continuously rotating clutch member 46. Journaled on the inner end of the axle 42 and adapted to cooperate with the clutch member 46 is an intermittently actuated clutch member 47. Formed integrally with and spaced inwardly from the clutch member 47 is a pinion 48. Adapted to cooperate with the pinion 48 in forming the power lift mechanism is a rack bar 49 which has a series of uniformly spaced pins 50 projecting from one side thereof and a rearwardly positioned pin 51 projecting from the other side thereof. The foremost pin 50 is relatively a little longer than the other pins and has journaled on the outer portion thereof a roller 52 for the purpose hereinafter set forth. Positioned on one side of the bar 49 and secured by means of bolts 53 to the longitudinal brace 32 is a rack guide plate 54. The rearward edge of the rack guide plate 54 is provided with a curved or cammed surface as shown at 55 which lies in the path of and is adapted to engage the rack pin 51 on the rear end of the rack bar 49 in retaining the rearmost pin 50 in gearing relation with the pinion 48 on the rearward return of the rack bar. Secured to and spaced from the rack bar plate 54 is a second rack bar guide plate 56 which is secured to the first plate by means of bolts 57. The plate 56 is positioned outside and adjacent to the pinion 48 and is provided with a circular guide surface 58. This guide surface 58 is located in the path of the roller 52 mounted on the foremost pin 50 of the rack bar 49 for guiding the rack bar and maintaining this foremost pin in engagement with the pinion when the rack bar reaches its rearmost position. The forward end of the rack bar 49 is pivotally connected by means of a pin 59 to the bifurcated portion 60 of a lower arm 61 of the lever 34. The lever 34 is provided with an upwardly extending arm 62, in the opposite sockets of which are upwardly extending offset steel straps 63, which are secured in place by bolts 64. The depth adjustment of the rear portion of the plow or the adjustment of the rear furrow wheel is controlled by a hand crank 65, which is mounted or journaled in a swivel connection, generally indicated by the reference character 66. This connection is supported in the aligned apertures 67 in and between the spaced steel straps 63. This hand adjustment 65 includes the conventional hand screw arrangement of an internally threaded sleeve, generally indicated by the reference character 68 and has its rear end pivotally connected as shown at 69 to a lever or arm 70, which in turn is bolted to the rear axle sleeve 28 in a manner well understood in the art. Pivotally mounted on a bracket 72 secured to frame member 17 by the bolt 73 is a trip lever 74, which may be provided with the usual trip cord extending therefrom to the operator's seat on the tractor. Secured to the lower end of the lever 74 is an offset bracket 75. Positioned between the bracket 75 and the lower end of the lever 74 is a roller or stop 76 which is adapted to engage a pawl 77 of the intermittently actuated clutch member 47 in a manner well understood in the art. The lever is normally swung to its rearmost position, or into engagement with the pawl 77 by a spring, not shown, which has its forward end connected to the lever and its rearward end to an ear formed on the bracket 21.

From the above description it will be obvious that I have provided a universal and unitary power lift mechanism for raising and lowering the plow, for supporting the land wheel and the land wheel axle, for supporting and connecting the furrow wheel axle and an adjustment for manually adjusting the furrow wheel axle, all of which mechanism is rigidly secured in one unit in the form of a supplemental frame, which supplemental frame can be slidably adjusted and clamped in various positions of adjustment on the main frame or beam of the plow construction so that various sizes or number of plow discs may be mounted or supported from the beam without modifying or changing any of these parts to make the change in the size of the plow.

The front end of the plow in the present invention is wholly supported on the draft bar of the tractor so that the front end of the plow is raised or lowered with respect to the draft bar of the tractor by the power derived from the power lift mechanism of the land wheel hereinbefore described, and the adjustment of the depth penetration of the front end of the plow is secured by adjusting the tractor draft bar with respect to the tractor.

This novel arrangement includes a downwardly and laterally extending draft bracket or plate 121 which is secured to the forward end of the beam 10 by bolts 122. Secured to the lower end of the plate 121 by means of bolts 123 is an upwardly and rearwardly extending draft brace 124. The rear end of the brace 124 is secured to the beam 10 by a clamping plate 125 and bolts 14. Secured to the lower end of the plate 121 by welding or otherwise, is a vertically extending post or plate 126. Formed on the upper end of the plate 126 is a bearing 127 in which is journaled a crank shaft 128. One end of the shaft 128 is provided with an upwardly and forwardly extending crank 129 which has its outer end, as shown at 130, pivotally connected to the forward end of the connecting link 131. The rear end of the link 131 is pivotally connected as shown at 132 to one of the upper arms 63 of the lever 34. Secured to the other end of the crank shaft 128 is a rearwardly extending crank 133. The free end of the crank 133 is pivotally connected as shown at 134 to a link 135. The other end of the link 135 is pivotally connected as shown at 136 to an ear 137 formed integrally with a draft clevis or hook 138. The draft hook 138 is pivotally connected as shown at 139 to the flanges of a channel bracket 140 which in turn is secured below the lower end of the draft bracket 121 by bolts 123. The draft hook 138 is adapted to engage the rear end of a substantially V-shaped draft bar 141 which has its forward spaced apart ends pivotally connected to the rear frame or housing of a tractor, generally indicated by the reference character 142. The draft bar 141 can be manually adjusted for regulating the height of the front end of the plow and depth penetration of the discs from the operator's seat on the tractor by a hand operating lever, sector and detent mechanism 143 which is supported on the upper portion of the tractor frame by brackets 143, 144 and a transverse angle 145. One end of the lever is pivotally connected as shown at 146 to the upper end of a spring pressed connecting rod 147. The lower end of the rod 147 is pivotally connected as shown at 148' to one end of a transverse angle member 148, which in turn is secured to the draft bar 141 by means of U-bolts 149. The hook 138 is held in engagement with the draft bar 141 by a plate 150 which has its forward end secured to the transverse member 149 by bolts 151. For a more detailed description of the construction of this adjustable draft hitch mechanism mounted on the tractor, reference may be had to H. E. Altgelt Patent No. 2,271,533, dated February 3, 1942. This lever mechanism 143 permits the adjustment of the depth penetration of the discs at the front end of the plow.

From the above construction it will be readily seen that the front end of the plow frame attached to the draw bar of the tractor is simultaneously raised or lowered with the rear end of the frame on the rear furrow wheel by the power lift mechanism operatively connected to the land wheel of the plow. The employment of this power lift or power actuated draft clevis or hook 138 supported on the draft bar of the tractor dispenses with the use of the front furrow wheel and permits the plow to be connected more closely to the tractor which provides certain advantages in turning at the ends of the field, and reduces the cost of manufacture to a substantial degree. The pivoted draw bar 141 of the tractor is manually adjustable from the operator's seat on the tractor by the manipulation of the lever mechanism 143 for regulating the depth penetration of the discs on the front end of the plow frame.

Other advantages of my improved plow include the combining of the power lift mechanism, the land wheel, the rear furrow wheel, the clutch mechanism, the adjustment for the rear furrow wheel and the tripping mechanism for the clutch into a single unit and on a supplemental frame which can be detachably and adjustably connected to the main beam of the plow so that various lengths of beams and various numbers of discs may be employed, or a long beam in which any desired number of discs may be supported thereon, I have not only provided a simple and compact structure and one which is economical to manufacture, but also one which will be adapted to fit a variety of sizes of plows.

While in the above specification I have disclosed one form which my invention may assume in practice, it will, of course, be understood that the same is capable of modification and that modification may be made without departing from the spirit and scope of the invention as expressed in the following claims.

What I claim as my invention and desire to secure by Letters Patent is:

1. A plow comprising a main frame, an adjustable rear furrow wheel supporting the rear end of said frame, a draft hook pivoted to the front end of said main frame and on the draft bar of a tractor, a land wheel for said main frame, and a power lift mechanism driven by said land wheel and operatively connected to said draft hook and said rear furrow wheel for raising and lowering said plow frame.

2. A disc plow comprising a frame, means for connecting and supporting the front end of said frame on the draft bar of a tractor, a rear furrow wheel supporting the rear end of said frame and movable relative thereto, an axle journaled on said frame, a land wheel secured to one end of said axle, a continuously driven clutch member secured adjacent the other end of said axle, an intermittently driven clutch member journaled on said axle and cooperating with said first named clutch member, a pinion formed integrally with said intermittently driven clutch member, a rack engageable with and actuated by said pinion, a lever pivoted to said frame and having one end thereof pivotally connected to said rack, and operative connections between the other end of said lever and said means and furrow wheel for raising and lowering said frame.

3. A disc plow comprising a frame, a draft clevis pivoted to said main frame for supporting and connecting the front end of said frame on the draft bar of a tractor, a rear furrow wheel supporting the rear end of said frame and movable relative thereto, an axle journaled on said frame, a land wheel secured adjacent the other end of said axle, an intermittently driven clutch member journaled on said axle and cooperating with said first named clutch member, a pinion formed integrally with said intermittently driven clutch member, a rack engageable with and actuated by said pinion, a lever pivoted intermediate its ends on said frame, a link connecting one end of said lever with said rack, and operative connection between the other end of said lever and said draft clevis and said furrow wheel for raising and lowering said frame.

CAMERON H. GEMBERLING.

REFERENCES CITED

The following references are of record in the file of this patent:

UNITED STATES PATENTS

| Number | Name | Date |
| --- | --- | --- |
| 1,377,049 | Altgelt | May 3, 1921 |
| 1,718,762 | Scarlett | June 25, 1929 |
| 2,057,080 | Altgelt et al. | Oct. 13, 1936 |
| 2,065,015 | Nielsen | Dec. 22, 1936 |
| 2,202,931 | Strandlund | June 4, 1940 |
| 2,248,505 | McKahin | July 8, 1941 |
| 2,271,533 | Altgelt | Feb. 3, 1942 |
| 2,351,369 | Rutter | June 13, 1944 |
| 2,390,968 | Traphagen | Dec. 11, 1945 |